US012755602B2

(12) United States Patent

Plimmer et al.

(10) Patent No.: US 12,755,602 B2
(45) Date of Patent: Oct. 6, 2026

(54) SHARED CELEBRATIONS IN A SHARED VIRTUAL GAMING ENVIRONMENT

(71) Applicant: IGT, Las Vegas, NV (US)

(72) Inventors: Bethany Plimmer, Lower Coverdale (CA); Aaron Corey, Moncton (CA); Karen Van Niekerk, Dieppe (CA); Todd Grimm, Riverview (CA); Michael Russ, Graz (AT)

(73) Assignee: IGT, Las Vegas, NV (US)

( * ) Notice: Subject to any disclaimer, the term of this patent is extended or adjusted under 35 U.S.C. 154(b) by 335 days.

(21) Appl. No.: 18/522,180

(22) Filed: Nov. 28, 2023

(65) Prior Publication Data

US 2025/0174073 A1 May 29, 2025

(51) Int. Cl.

| | |
|---|---|
| ***G07F 17/00*** | (2006.01) |
| ***G06T 13/40*** | (2011.01) |
| ***G06T 15/10*** | (2011.01) |
| ***G06T 19/00*** | (2011.01) |
| ***G07F 17/32*** | (2006.01) |

(52) U.S. Cl.

CPC .......... *G07F 17/3213* (2013.01); *G06T 13/40* (2013.01); *G06T 15/10* (2013.01); *G06T 19/003* (2013.01); *G07F 17/323* (2013.01); *G07F 17/3267* (2013.01); *G06T 2219/024* (2013.01)

(58) Field of Classification Search

None

See application file for complete search history.

(56) References Cited

U.S. PATENT DOCUMENTS 10,771,512 B2 * 9/2020 Escudero .............. H04W 12/50
11,270,672 B1 * 3/2022 Lee .......................... G06F 3/017
11,392,636 B2 * 7/2022 McKinnon .......... G06F 16/9535
11,449,189 B1 * 9/2022 Bond ..................... G06F 3/0482
2010/0083140 A1 * 4/2010 Dawson .................. A63F 13/58 715/757
2011/0010325 A1 * 1/2011 Brillhart ................ G06N 3/006 715/849
2011/0128281 A1 * 6/2011 Bhogal ............... G06F 3/04815 345/419
2012/0028703 A1 * 2/2012 Anderson ........... G07F 17/3258 463/25
2013/0286004 A1 * 10/2013 McCulloch ........... G06T 19/006 345/419

(Continued)

*Primary Examiner* — Paul A D'Agostino

(74) *Attorney, Agent, or Firm* — Spencer Fane LLP; William M. Kelly

(57) ABSTRACT

A processor circuit transmits display data corresponding to a shared virtual environment (SVE) to a plurality of player devices including user display data that causes a display device of each player device to render a portion of the SVE based on a virtual orientation of the player device and a virtual location of the player in the SVE. The processor circuit determines that a celebration trigger condition has been met for a first player of the plurality of players and selects a subset of players of the plurality of players based on the celebration trigger condition and a celebration viewing parameter value associated with each player of the subset of players. The processor circuit transmits celebration display data corresponding to the celebration to a subset of player devices associated with the subset of players to render celebration content associated with the celebration trigger condition.

20 Claims, 10 Drawing Sheets

(56) References Cited

U.S. PATENT DOCUMENTS

| | | | | |
|---|---|---|---|---|
| 2014/0121015 | A1* | 5/2014 | Massing | G07F 17/3211 463/31 |
| 2014/0135124 | A1* | 5/2014 | Jaqua | A63F 3/00214 273/287 |
| 2014/0206432 | A1* | 7/2014 | Radek | G07F 17/3223 463/25 |
| 2014/0267404 | A1* | 9/2014 | Mitchell | G06T 19/006 345/633 |
| 2017/0209795 | A1* | 7/2017 | Harvey | A63F 13/65 |
| 2019/0270001 | A1* | 9/2019 | Cozad | G09B 7/02 |
| 2019/0295320 | A1* | 9/2019 | Ghatak | G06F 3/011 |
| 2020/0360823 | A1* | 11/2020 | Cahill | H04L 67/131 |
| 2021/0043043 | A1* | 2/2021 | Burns | G07F 17/3276 |
| 2021/0104100 | A1* | 4/2021 | Whitney | G06T 13/40 |
| 2021/0204014 | A1* | 7/2021 | Kawakami | H04N 21/2743 |
| 2022/0043672 | A1* | 2/2022 | Chhabra | G06F 9/45558 |
| 2022/0122328 | A1* | 4/2022 | Giovannetti | G06T 7/70 |
| 2022/0137701 | A1* | 5/2022 | Bowman | G06T 19/006 345/156 |
| 2025/0174073 | A1* | 5/2025 | Plimmer | G07F 17/3213 |

* cited by examiner

500

SHARED CELEBRATIONS IN A SHARED VIRTUAL GAMING ENVIRONMENT

BACKGROUND

Embodiments described herein relate to a shared virtual gaming environment, and in particular to shared celebrations in a shared virtual gaming environment, and related devices, systems, and methods. As the adoption of metaverse technology becomes more widespread, many companies are developing persistent virtual worlds that include simulated and/or enhanced reproductions of real-world locations, including gaming environments such as casinos for example. There is a need to address these and other technical problems with unique technical solutions that provide a more immersive and desirable experience for users in a way that provides consistent interactions and experiences among players in a common virtual space, to increase immersion and enhance enjoyment.

BRIEF SUMMARY

According to some embodiments, a system includes a processor circuit and a memory coupled to the processor circuit. The memory includes machine readable instructions that, when executed by the processor circuit, cause the processor circuit to provide a real-time environmental model of a shared virtual environment (SVE) comprising a plurality of virtual persons and a plurality of virtual gaming devices. The instructions further cause the processor circuit to transmit display data corresponding to the SVE to a plurality of player devices worn by a plurality of players, the display data for each player device comprising user display data that causes a display device of the player device to render a portion of the SVE based on a virtual orientation of the player device and a virtual location of the player in the SVE. The instructions further cause the processor circuit to determine that a celebration trigger condition has been met for a first player of the plurality of players. The instructions further cause the processor circuit to select a subset of players of the plurality of players based on the celebration trigger condition and a celebration viewing parameter value associated with each player of the subset of players. The instructions further cause the processor circuit to transmit celebration display data corresponding to the celebration trigger condition to a subset of player devices associated with the subset of players, wherein the celebration display data causes each display device of the subset of player devices to render celebration content associated with the celebration trigger condition.

According to some embodiments, a wearable gaming device includes a display device, a processor circuit, and a memory coupled to the processor circuit. The memory includes machine readable instructions that, when executed by the processor circuit, cause the processor circuit to provide a real-time environmental model of a shared virtual environment (SVE) comprising a plurality of virtual persons and a plurality of virtual gaming devices. The instructions further cause the processor circuit to transmit display data corresponding to the SVE to a plurality of player devices worn by a plurality of players, the plurality of player devices comprising the wearable gaming device, the display data for each player device comprising user display data that causes the display device to render a portion of the SVE based on a virtual orientation of the player device and a virtual location of the player in the SVE. The instructions further cause the processor circuit to receive an indication that a first player wearing the wearable gaming device has been selected based on a celebration trigger condition associated with another player of the plurality of players and a celebration viewing parameter value associated with the first player. The instructions further cause the processor circuit to receive celebration display data corresponding to the celebration trigger condition. The instructions further cause the processor circuit to, based on the celebration display data, render, by the display device, celebration content associated with the celebration trigger condition.

According to some embodiments, a method includes providing, by a processor circuit, a real-time environmental model of a shared virtual environment (SVE) comprising a plurality of virtual persons and a plurality of virtual gaming devices. The method further includes transmitting, by the processor circuit, display data corresponding to the SVE to a plurality of player devices worn by a plurality of players, the display data for each player device comprising user display data that causes a display device of the player device to render a portion of the SVE based on a virtual orientation of the player device and a virtual location of the player in the SVE. The method further includes determining, by the processor circuit, that a celebration trigger condition has been met for a first player of the plurality of players. The method further includes selecting, by the processor circuit, a subset of players of the plurality of players based on the celebration trigger condition and a celebration viewing parameter value associated with each player of the subset of players. The method further includes transmitting, by the processor circuit, celebration display data corresponding to the celebration to a subset of player devices associated with the subset of players, wherein the celebration display data causes each display device of the subset of player devices to render celebration content associated with the celebration trigger condition.

DETAILED DESCRIPTION

Figure 1:
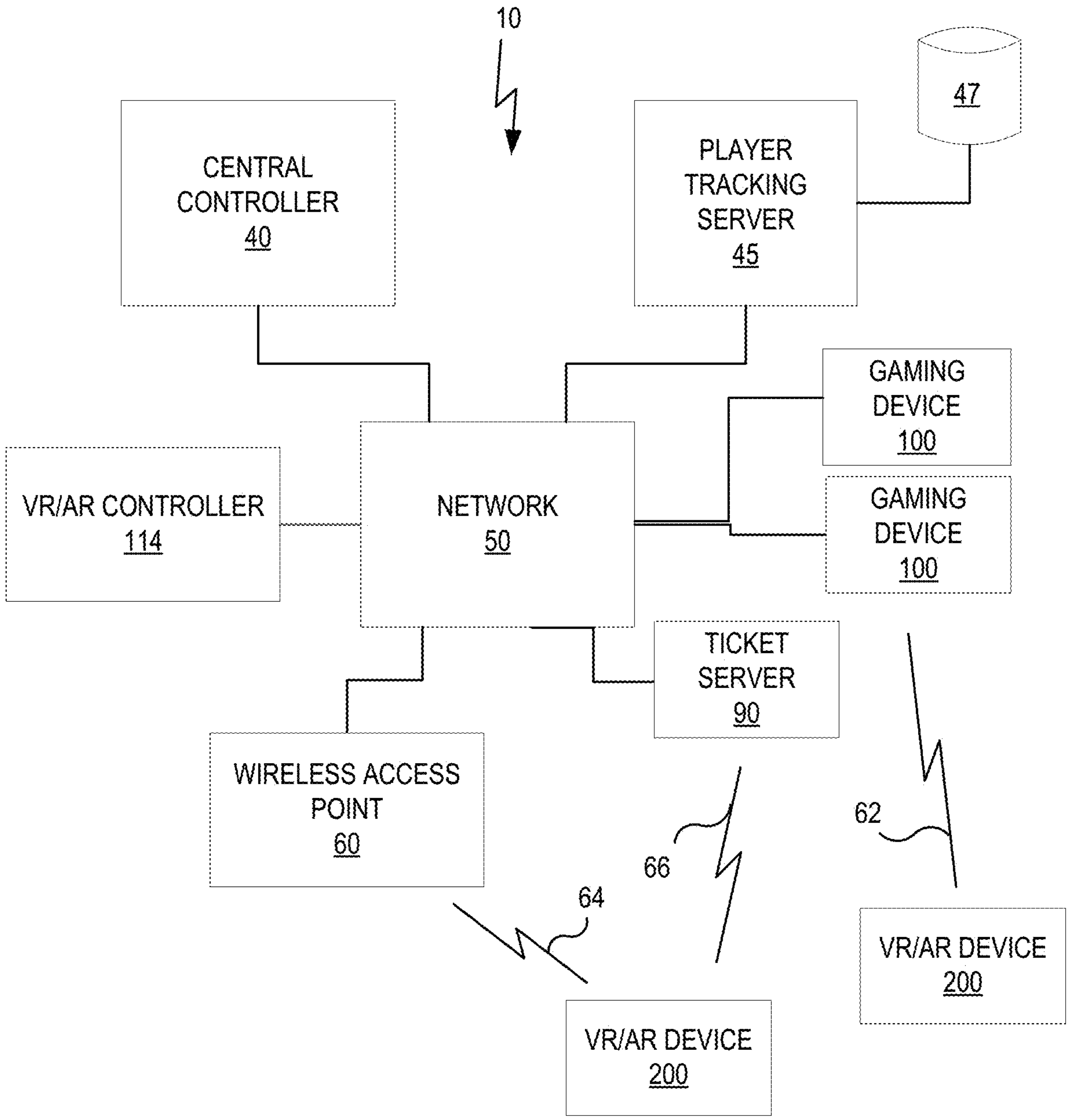
FIG. 1 is a schematic block diagram illustrating a network configuration for a plurality of gaming devices according to some embodiments.

For many players, part of the excitement of playing in a casino is the attention drawn by large jackpot wins and other significant game events. There are often elaborate animations with sounds that play in response to these events so that the attention of nearby players nearby will be drawn to the game. Depending on the type of game, these may be displayed on the top screen of an Electronic Gaming Machine (EGM) or shown on a large overhead display screen above a bank of EGMs participating in a linked game (e.g., linked progressive, community game, tournament, etc.) These types of features may be referred to as celebrations or win celebrations. The celebrations may attract more players to the game to help increase gameplay (and revenue) and may also create added excitement and entertainment for the players.

Features of the metaverse have the potential to give these types of celebrations far greater reach because they are not constrained by physical proximity (e.g., players can see and hear a celebration delivered through the metaverse no matter how far away they are from the winning player). By exposing more players to the celebrations, player excitement and engagement may be increased, and additional game play may be stimulated on the games that generate these celebrations. Another advantage of these and other features is the ability to target the celebrations at players who are most likely to be enticed to play the game.

Extending a live casino experience into the metaverse poses several challenges, such as replicating the sense of excitement a player experiences in a land-based casino, attracting the attention of players to online casino games, including games that are new or that have higher revenue generating potential, so that the players are encouraged to try it, attracting the attention of players in a manner that feels spontaneous and organic instead of feeling like an advertisement, attract the attention of the specific players who are likely to try the game without annoying the players who are not interested in the game, and/or keeping players enthusiastic and engaged in the overall gaming experience in an online casino.

Embodiments disclosed herein solve these and other problems in a number of ways, including delivering celebrations through the online casino/metaverse to players, regardless of their physical location, targeting the celebrations to specific players or groups of players based on their stated preferences and their past gaming activity, and/or providing players with an immersive, unobstructed view of the celebrations. Virtual reality (VR), augmented reality (AR), and other technologies can be used to deliver the content, allowing the player to be immersed in the animated elements of the celebration. Celebration content may leverage the unique capabilities of the metaverse so that the celebrations are not constrained in the same ways as celebrations in land-based casinos. For example, the shape and size of the animation is not limited to content that fits on a typical casino overhead sign, e.g., the celebration content could wrap around the game that the player is currently playing so that it doesn't disrupt their game play. The celebration content delivered to each player also does not need to be identical to the content delivered to other players. For example, the celebration content can be localized (e.g., delivered in the player's preferred language). In some examples, the player can independently control the sound volume of the celebrations, so they don't drown out the game they are playing, and player preferences can be used to control the celebration content delivered to them. For example, a player may filter the celebrations according to the game types they are interested in, so that only celebrations from certain players or groups of players are shown to them, e.g., they may want to only see celebrations from their friends, from influencers, from other players in their country and/or region, etc. Celebrations can be accompanied by live video feeds and/or animated avatars of winning players, e.g., according to player preferences. Players can be given the option to replay the celebrations, and can post the celebration (e.g., as a video clip) to a social media site or social media component of the online casino.

In some embodiments, virtual and/or online casinos may be delivered via a variety of computing devices, such as via a web browser, app, AR/VR system, etc. In some examples, a webcam or other image capture device may be used to selectively share images of players within the metaverse environment. In some examples, a webcam may be used as an input device for an animated Avatar. For example, in some embodiments, a video feed may be analyzed, e.g., by an artificial intelligence or machine learning model, to cause a player's avatar to replicate the player's reactions and expressions. Other players may see the avatar in real time during the celebration, in place of and/or in addition to the live webcam footage. The system may also analyze game events and automatically generate a realistic and plausible reaction for the player's avatar.

In some examples, player preferences and data about the player's past game play can be mined and analyzed to determine their game preferences. This information may be used to target celebrations at players who are likely to try the game that generated the celebration. In some examples, celebrations can be localized according to each player's language preferences.

VR and AR can be used to deliver celebrations that are more immersive for the player. For example, VR can be used to surround the player with graphical elements of the celebration, and AR can be used to overlay graphical elements of the celebration on a live video image.

Social media features may also be included, and may be provided separately from the virtual casino or integrated into the virtual casino. For example, winning players can post video clips or still images of their celebrations to social media, and other players can post their reactions to the celebrations that have been posted. Reactions may include an animated clip or still image of the player's avatar reacting, a static or animated emoji, a text message, etc.

There are several target audiences for these celebrations (i.e., the players who will see and/or hear the celebration), including a triggering player, such as a winning player who won an award or jackpot or who triggered some other significant event in a game, other participating players who are playing the same game at the same as the winning player, such as players who are playing in a linked game such as a linked progressive, community game or tournament, and/or other targeted players who are playing different games in the same virtual casino as the winning player, but who might be interested in trying the game that triggered the celebration.

An advantage of these and other embodiments is the ability to ensure that the celebration is being seen and/or heard by players for whom the celebration is relevant in some way. Determining relevance may advance the purpose of the celebration, e.g., to increase the enjoyment of the players who are playing the game and to encourage more players to play the game. Boosting game play and boosting player enjoyment are synergistic effects of these and other types of celebrations, with each feature feeding the other and helping to increase game revenue. The celebration may be relevant to the winning player because it was directly triggered by something that happened to them during their game play session, and it is serving to celebrate that event and draw attention to it. The celebration shines a spotlight on their win and sends the message that this event is important and special. The celebration may be relevant to the other players playing the same game because it helps them aspire to be the next winner. It creates a sense of longing and anticipation in these players by showing them what they could experience if they win. The celebration may be relevant to players who are currently playing different games in the same virtual casino if it aligns with their gaming interests. The celebration creates awareness of the game and functions as a promotional tool for the game. It sends a message that they might wish to try playing this game themselves because it's exciting and fun, and that it aligns with their personal preferences. Because the celebration occurs spontaneously in response to another players' game play and highlights the fun and good fortune that other players are experiencing, the celebration may feel less like a game advertisement.

Delivering celebrations to the third group, i.e., targeted players, may employ additional functionality to ensure that the players perceive the celebration as being relevant to them. For example, bombarding all players in the virtual casino with every celebration may not be desirable since it could make the overall gaming experience distracting and overwhelming for the players. By identifying players who are likely to be interested in the game, the delivery of the celebrations may be focused on those players.

Targeting celebrations at potentially interested players can involve several sources of player information. For example, preferences that are configured by the player to indicate their favorite games genres, game features or other game characteristics (progressive jackpots, persistent pots, thematic elements, etc.) may be accessed directly. Preferences may also be inferred automatically from the player's past gaming activity, such as affinity for certain game themes, genres, features, etc. (i.e. characteristics that are common to the games they play most often or have spent the most money on), average wager amounts, typical wagering patterns, affinity for certain credit denominations, and/or affinity for progressive jackpots, bonus pots (persistent or non-persistent), free spins, pick-a-prize bonuses, etc. By using direct and indirect player preferences and gaming behavior to decide which players will see a celebration, it helps ensure that the celebration is relevant to the recipients.

Delivery of celebrations through a virtual casino also creates additional opportunities that may be impractical in a land-based casino environment, such as the ability of players to filter and control what celebrations are delivered to them, the ability to have a personalized animated avatar that reacts to celebrations, the ability to re-play a celebration in order to catch something they missed during the first live viewing, the ability to post video clips of a celebration directly to a social media site or a social media component of the virtual casino, and/or the ability to use immersive technologies such as virtual reality to put the player into the middle of the celebration animation. In some examples, reactions and participation in celebrations may be tracked, e.g., by recording frequency of positive reactions to game events and/or other players' celebrations, with accompanying benefits for high frequency celebrators in a certain time period (e.g., week, month, year, etc.), such as cosmetic benefits (e.g., avatar enhancements), game benefits (e.g., higher paytables), and/or other benefits, as desired.

In some examples, a celebration may be triggered by a win or other significant event in a progressive game, community game or tournament game in a virtual casino. Celebrations triggered by the events in the game may be delivered to, the winning player, other players playing the same gams, other players who would potentially be interested in playing the game, and/or players who may be interested in celebrating and/or congratulating players who have one. For example, where a winning player might me represented by their avatar, the risk of allowing members of the general public to participate in a celebration connected to a particular avatar and/or win amount may be reduced.

Data may be collected about the player's gaming activity, including their wagers, selected credit denominations and the games they play, and players can configure preferences, including game genres and game themes they prefer. The player data and preferences may be analyzed to determine what sorts of games interest the player. Factors may include affinity for certain game themes and genres (based on time spent and/money spent), thematic elements common to the player's preferred games (e.g., affinity for Egyptian themes, Asian themes, animal/wildlife related themes, aquatic themes, game show themes, celebrity themes, movie/TV themes, etc.), features common to the player's preferred games (e.g., affinity for free spins bonuses, pick-a-prize bonuses, wild symbols, etc.), affinity for progressive jackpots, bonus pots, community games and tournament games, and/or preferred credit denominations, etc. The results of analyzing the player data and player preferences may be used to ensure that celebrations are shown to players who are most likely to try the game, and to personalize the win celebrations based on the target audiences, e.g., by including a personalized sound kit and/or song set. In some examples, this personally set song may be shared with everyone in the meta casino environment or area of the casino environment.

Celebrations may be formatted so that they do not obstruct or interfere with the game that the player is playing. For example, the celebration can wrap around the perimeter of the player's game, the celebration can be confined to a banner at the top or bottom of the screen, the celebration can be confined to a sidebar, i.e., on the left- or right-hand side of the screen. In some examples, the player can reduce or mute the volume of the sounds of the celebration independently from the game they are playing. The sound settings may be persistent for the player so that future celebrations respect the player's chosen volume level. In some examples, the player can dismiss the celebration if they do not wish to continue seeing it, while future instances of the celebration will still be shown to the player. The player can flag the celebration as something they are not interested in, and may not be shown to that player again. The player can bookmark a game that generated the celebration so that they can easily find that game later on if they wish to try playing it. In some examples, after a player has seen a celebration, they have the option of re-playing it. In some examples, the player can save their win celebration for events in a personalized collection that can be accessed and/or shared with other players. This allows players to collect events and then be able to review them again in the future, with timestamps, special effects, and personalization, as desired.

In some examples, players may have the option of using a webcam feed to show their live reactions to the celebration and/or using an avatar to show their live reactions to the celebration. The player can pre-set their avatar to automatically show a specific reaction to celebrations (e.g., selected from a list of reaction styles), and/or the player can pre-set their avatar to automatically show a random reaction style to celebrations. The player can also manually select their avatar's rection style in real time each time a celebration occurs. In some examples, avatars can employ artificial intelligence and/or machine learning to make their reactions more realistic or unique. For example, an AI model may use contextual elements such as in-game events to generate or influence the avatar's reaction and expressions, and may analyze a player's webcam feed so that the player's avatar can duplicate the player's expressions and reactions.

In some examples, winning players can post a video of their celebrations directly to social media, and other players may react to celebration videos posted to social media by other players. For example, reactions can be shown in real time during the celebration as animated emojis (hands clapping, thumbs up, party hats, party horns, smiling/laughing faces, hearts, etc.). These emojis can be mixed in with the celebration graphics to become part of the celebration.

In some examples, VR or AR technologies can be used to create an immersive celebration experience for the winning player and other players playing the same linked game. For example, instead of watching a two-dimensional celebration animation, the player may see elements of the celebration all around them in a virtual environment, such as fireworks going off around the player, coins falling around the player, confetti falling around the player, game elements and/or symbols flying around the player, etc. In some examples, the animated avatars of other players can surround the player and react to the celebration (e.g. a virtual audience). In some examples, the player's favorite song and/or band would play as part of the celebration. In some examples, the player may take a "victory lap" of the game environment, e.g., in a virtual car, run, walk, parade, etc.) allowing the player to be celebrated on their current win event.

In some examples, other associated players may be part of the celebration, e.g., with the faces of other players and/or avatars (e.g., a player's friends and/or other winners of the same prize) being shown on coins or other elements of the celebration. In some examples, during a large win and/or celebration, some or all of the metaverse environment may pause so that everyone can be fully immersed in the celebration event, e.g., on a large communal dance floor for example. These and other unique technical solutions address the technical problem of providing a more immersive and desirable experience for users in a way that provides consistent interactions and experiences among players in a common virtual space, to increase immersion and enhance enjoyment.

Before discussing these and other embodiments in greater detail, reference will be made to an example of a gaming system for implementing embodiments disclosed herein. In this regard, FIG. 1 illustrates a gaming system 10 including a plurality of gaming devices 100 is illustrated. As discussed above, the gaming devices 100 may be one type of a variety of different types of gaming devices, such as electronic gaming machines (EGMs), mobile gaming devices, or other devices, for example. The gaming system 10 may be located, for example, on the premises of a gaming establishment, such as a casino. The gaming devices 100, which are typically situated on a casino floor, may be in communication with each other and/or at least one central controller 40 through a data communication network 50 that may include a remote communication link. The data communication network 50 may be a private data communication network that is operated, for example, by the gaming facility that operates the gaming devices 100. Communications over the data communication network 50 may be encrypted for security. The central controller 40 may be any suitable server or computing device which includes at least one processing circuit and at least one memory or storage device. Each gaming device 100 may include a processing circuit that transmits and receives events, messages, commands or any other suitable data or signal between the gaming device 100 and the central controller 40. The gaming device processing circuit is operable to execute such communicated events, messages or commands in conjunction with the operation of the gaming device 100. Moreover, the processing circuit of the central controller 40 is configured to transmit and receive events, messages, commands or any other suitable data or signal between the central controller 40 and each of the individual gaming devices 100. In some embodiments, one or more of the functions of the central controller 40 may be performed by one or more gaming device processing circuits. Moreover, in some embodiments, one or more of the functions of one or more gaming device processing circuits as disclosed herein may be performed by the central controller 40.

A wireless access point 60 provides wireless access to the data communication network 50. The wireless access point 60 may be connected to the data communication network 50 as illustrated in FIG. 1, and/or may be connected directly to the central controller 40 or another server connected to the data communication network 50.

A player tracking server 45 may also be connected through the data communication network 50. The player tracking server 45 may manage a player tracking account that tracks the player's gameplay and spending and/or other player preferences and customizations, manages loyalty awards for the player, manages funds deposited or advanced on behalf of the player, and other functions. Player information managed by the player tracking server 45 may be stored in a player information database 47.

As further illustrated in FIG. 1, the gaming system 10 may include a ticket server 90 that is configured to print and/or dispense wagering tickets. The ticket server 90 may be in communication with the central controller 40 through the data communication network 50. Each ticket server 90 may include a processing circuit that transmits and receives events, messages, commands or any other suitable data or signal between the ticket server 90 and the central controller 40. The ticket server 90 processing circuit may be operable to execute such communicated events, messages or commands in conjunction with the operation of the ticket server 90. Moreover, in some embodiments, one or more of the functions of one or more ticket server 90 processing circuits as disclosed herein may be performed by the central controller 40.

The gaming devices 100 communicate with one or more elements of the gaming system 10 to coordinate providing wagering games and other functionality. For example, in some embodiments, the gaming device 100 may communicate directly with the ticket server 90 over a wireless interface 62, which may be a WiFi link, a Bluetooth link, a near field communications (NFC) link, etc. In other embodiments, the gaming device 100 may communicate with the data communication network 50 (and devices connected thereto, including other gaming devices 100) over a wireless interface 64 with the wireless access point 60. The wireless interface 64 may include a WiFi link, a Bluetooth link, an NFC link, etc. In still further embodiments, the gaming devices 100 may communicate simultaneously with both the ticket server 90 over the wireless interface 66 and the wireless access point 60 over the wireless interface 64. Some embodiments provide that gaming devices 100 may communicate with other gaming devices over a wireless interface 64. In these embodiments, wireless interface 62, wireless interface 64 and wireless interface 66 may use different communication protocols and/or different communication resources, such as different frequencies, time slots, spreading codes, etc.

The wireless interfaces 62, 66 allow a plurality of virtual reality (VR) and/or augmented reality (AR) devices, referred to herein as VR/AR devices 200, to coordinate the generation and rendering of VR and/or AR images to the player. As used herein, VR/AR devices 200 may include VR and/or AR functionality, as desired. In some embodiments, the gaming system 10 includes a VR/AR controller 114. The VR/AR controller 114 may be a computing system that communicates through the data communication network 50 with the EGMs 100 and the VR devices 200 to coordinate the generation and rendering of virtual images to one or more players using the VR devices 200. The VR/AR controller 114 may be implemented within or separately from the central controller 40.

In some embodiments, the VR/AR controller 114 may coordinate the generation and display of the virtual images of the same virtual object to more than one player by more than one VR/AR device 200. As described in more detail below, this may enable multiple players to interact with the same virtual object together in real time. This feature can be used to provide a shared multiplayer experience to multiple players at the same time.

Moreover, in some embodiments, the VR/AR controller 114 may coordinate the generation and display of the same virtual object to players at different physical locations, as will be described in more detail below.

The VR/AR controller 114 may store a three-dimensional wireframe map of a gaming area, such as a casino floor, and may provide the three-dimensional wireframe map to the VR/AR devices 200. The wireframe map may store various information about EGMs in the gaming area, such as the identity, type and location of various types of EGMs. The three-dimensional wireframe map may enable a VR/AR device 200 to more quickly and accurately determine its position and/or orientation within the gaming area, and also may enable the VR/AR device 200 to assist the player in navigating the gaming area while using the VR/AR device 200. The generation of three-dimensional wireframe maps is described in more detail below.

In some embodiments, at least some processing of virtual images and/or objects that are rendered by the VR devices 200 may be performed by the VR/AR controller 114, thereby offloading at least some processing requirements from the VR devices 200.

Figure 2A:
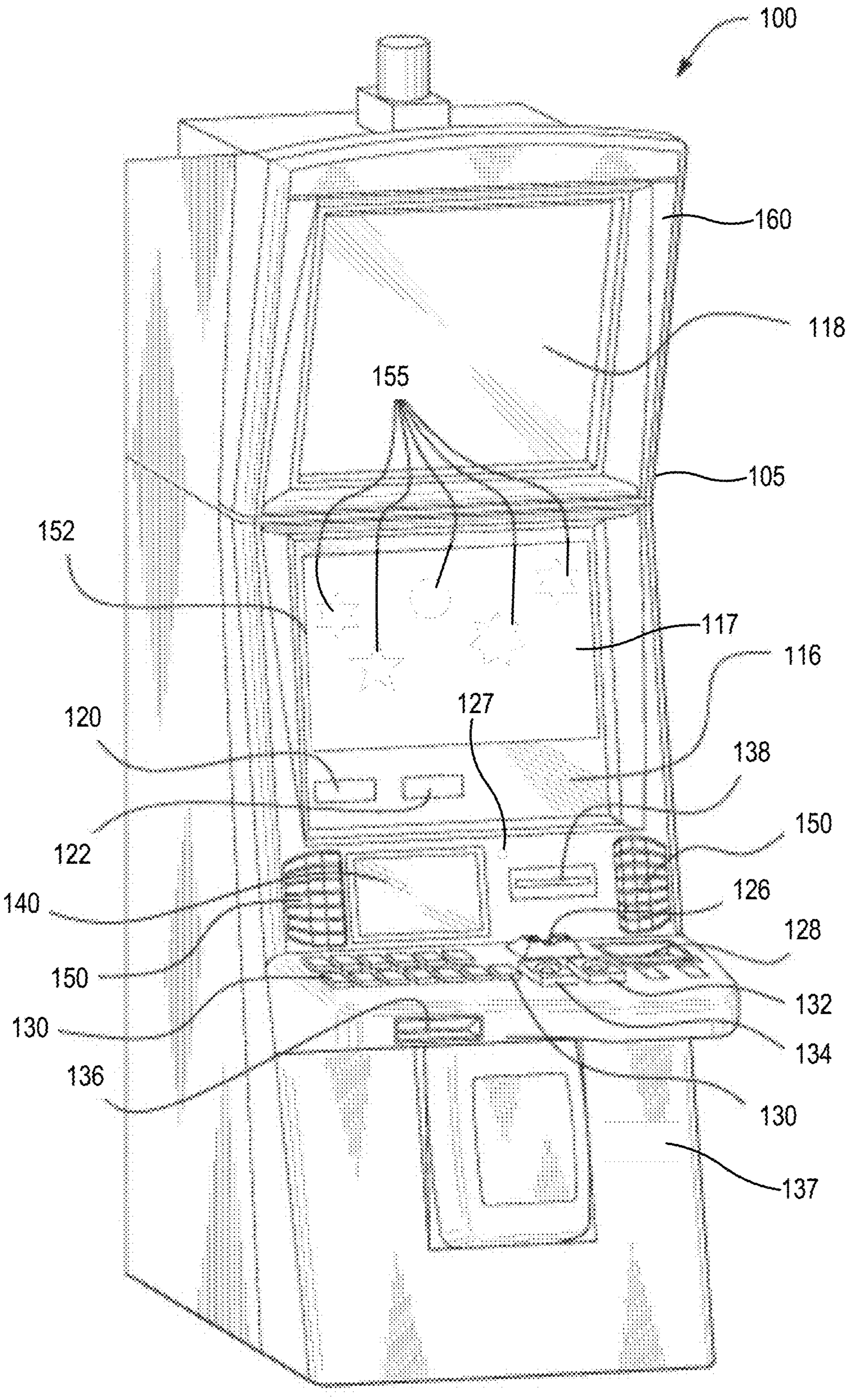
FIG. 2A is a perspective view of a gaming device that can be configured according to some embodiments.
Figure 2B:
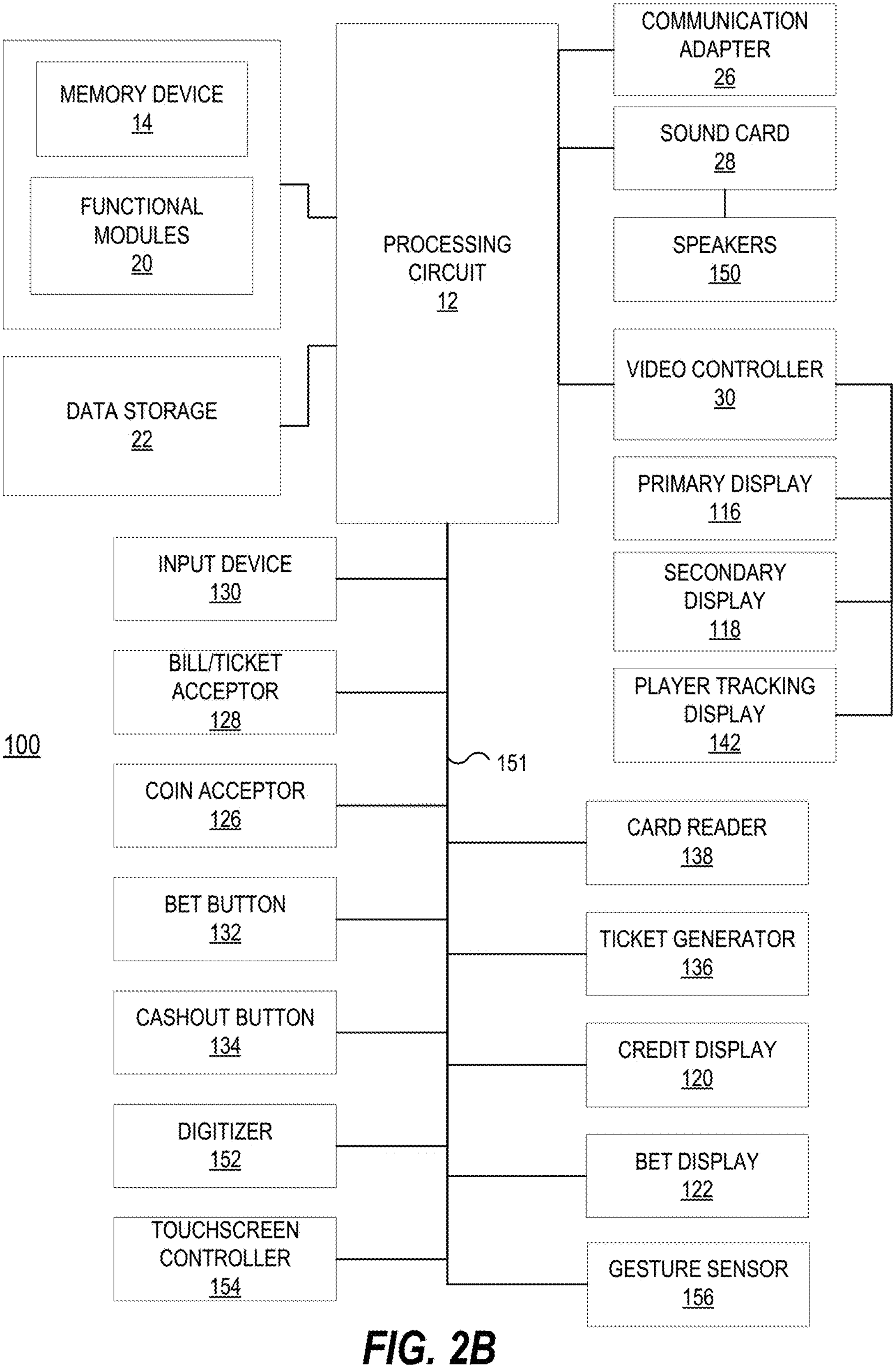
FIG. 2B is a schematic block diagram illustrating an electronic configuration for a gaming device according to some embodiments.
Figure 2C:
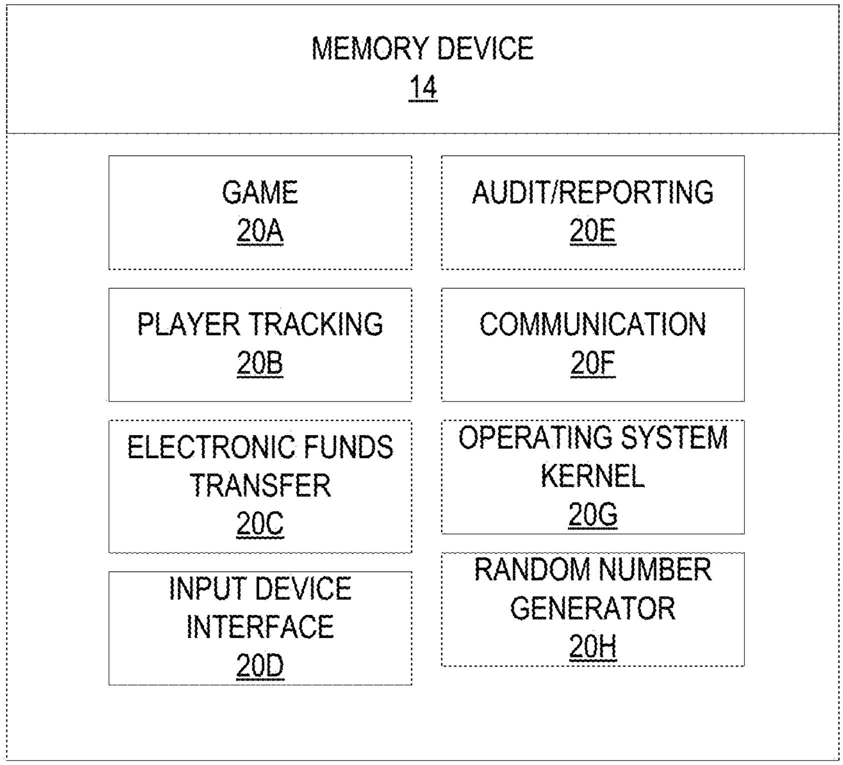
FIG. 2C is a schematic block diagram that illustrates various functional modules of a gaming device according to some embodiments.

Embodiments herein may include different types of gaming devices. One example of a gaming device includes a gaming device 100 that can use gesture and/or touch-based inputs according to various embodiments is illustrated in FIGS. 2A, 2B, and 2C in which FIG. 2A is a perspective view of a gaming device 100 illustrating various physical features of the device, FIG. 2B is a functional block diagram that schematically illustrates an electronic relationship of various elements of the gaming device 100, and FIG. 2C illustrates various functional modules that can be stored in a memory device of the gaming device 100. The embodiments shown in FIGS. 2A to 2C are provided as examples for illustrative purposes only. It will be appreciated that gaming devices may come in many different shapes, sizes, layouts, form factors, and configurations, and with varying numbers and types of input and output devices, and that embodiments are not limited to the particular gaming device structures described herein.

Gaming devices 100 typically include a number of standard features, many of which are illustrated in FIGS. 2A and 2B. For example, referring to FIG. 2A, a gaming device 100 (which is an EGM 160 in this embodiment) may include a support structure, housing 105 (e.g., cabinet) which provides support for a plurality of displays, inputs, outputs, controls and other features that enable a player to interact with the gaming device 100.

The gaming device 100 illustrated in FIG. 2A includes a number of display devices, including a primary display device 116 located in a central portion of the housing 105 and a secondary display device 118 located in an upper portion of the housing 105. A plurality of game components 155 are displayed on a display screen 117 of the primary display device 116. It will be appreciated that one or more of the display devices 116, 118 may be omitted, or that the display devices 116, 118 may be combined into a single display device. The gaming device 100 may further include a player tracking display 142, a credit display 120, and a bet display 122. The credit display 120 displays a player's current number of credits, cash, account balance or the equivalent. The bet display 122 displays a player's amount wagered. Locations of these displays are merely illustrative as any of these displays may be located anywhere on the gaming device 100.

The player tracking display 142 may be used to display a service window that allows the player to interact with, for example, their player loyalty account to obtain features, bonuses, comps, etc. In other embodiments, additional display screens may be provided beyond those illustrated in FIG. 2A. In some embodiments, one or more of the player tracking display 142, the credit display 120 and the bet display 122 may be displayed in one or more portions of one or more other displays that display other game related visual content. For example, one or more of the player tracking display 142, the credit display 120 and the bet display 122 may be displayed in a picture in a picture on one or more displays.

The gaming device 100 may further include a number of input devices 130 that allow a player to provide various inputs to the gaming device 100, either before, during or after a game has been played. The gaming device may further include a game play initiation button 132 and a cashout button 134. The cashout button 134 is utilized to receive a cash payment or any other suitable form of payment corresponding to a quantity of remaining credits of a credit display.

In some embodiments, one or more input devices of the gaming device 100 are one or more game play activation devices that are each used to initiate a play of a game on the gaming device 100 or a sequence of events associated with the gaming device 100 following appropriate funding of the gaming device 100. The example gaming device 100 illustrated in FIGS. 2A and 2B includes a game play activation device in the form of a game play initiation button 132. It should be appreciated that, in other embodiments, the gaming device 100 begins game play automatically upon appropriate funding rather than upon utilization of the game play activation device.

In some embodiments, one or more input device 130 of the gaming device 100 may include wagering or betting functionality. For example, a maximum wagering or betting function may be provided that, when utilized, causes a maximum wager to be placed. Another such wagering or betting function is a repeat the bet device that, when utilized, causes the previously-placed wager to be placed. A further such wagering or betting function is a bet one function. A bet is placed upon utilization of the bet one function. The bet is increased by one credit each time the bet one device is utilized. Upon the utilization of the bet one function, a quantity of credits shown in a credit display (as described below) decreases by one, and a number of credits shown in a bet display (as described below) increases by one.

In some embodiments, as shown in FIG. 2B, the input device(s) 130 may include and/or interact with additional components, such as gesture sensors 156 for gesture input devices, and/or a touch-sensitive display that includes a digitizer 152 and a touchscreen controller 154 for touch input devices, as disclosed herein. The player may interact with the gaming device 100 by touching virtual buttons on one or more of the display devices 116, 118, 140. Accordingly, any of the above-described input devices, such as the input device 130, the game play initiation button 132 and/or the cashout button 134 may be provided as virtual buttons or regions on one or more of the display devices 116, 118, 140.

Referring briefly to FIG. 2B, operation of the primary display device 116, the secondary display device 118 and the player tracking display 142 may be controlled by a video controller 30 that receives video data from a processing circuit 12 or directly from a memory device 14 and displays the video data on the display screen. The credit display 120 and the bet display 122 are typically implemented as simple liquid crystal display (LCD) or light emitting diode (LED) displays that display a number of credits available for wagering and a number of credits being wagered on a particular game. Accordingly, the credit display 120 and the bet display 122 may be driven directly by the processing circuit 12. In some embodiments however, the credit display 120 and/or the bet display 122 may be driven by the video controller 30.

Referring again to FIG. 2A, the display devices 116, 118, 140 may include, without limitation: a cathode ray tube, a plasma display, an LCD, a display based on LEDs, a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 116, 118, 140 may include a touchscreen with an associated touchscreen controller 154 and digitizer 152. The display devices 116, 118, 140 may be of any suitable size, shape, and/or configuration. The display devices 116, 118, 140 may include flat or curved display surfaces.

The display devices 116, 118, 140 and video controller 30 of the gaming device 100 are generally configured to display one or more game and/or non-game images, symbols, and indicia. In certain embodiments, the display devices 116, 118, 140 of the gaming device 100 are configured to display any suitable visual representation or exhibition of the movement of objects; dynamic lighting; video images; images of people, characters, places, things, and faces of cards; and the like. In certain embodiments, the display devices 116, 118, 140 of the gaming device 100 are configured to display one or more virtual reels, one or more virtual wheels, and/or one or more virtual dice. In other embodiments, certain of the displayed images, symbols, and indicia are in mechanical form. That is, in these embodiments, the display device 116, 118, 140 includes any electromechanical device, such as one or more rotatable wheels, one or more reels, and/or one or more dice, configured to display at least one or a plurality of game or other suitable images, symbols, or indicia.

The gaming device 100 also includes various features that enable a player to deposit credits in the gaming device 100 and withdraw credits from the gaming device 100, such as in the form of a payout of winnings, credits, etc. For example, the gaming device 100 may include a bill/ticket dispenser 136, a bill/ticket acceptor 128, and a coin acceptor 126 that allows the player to deposit coins into the gaming device 100.

As illustrated in FIG. 2A, the gaming device 100 may also include a currency dispenser 137 that may include a note dispenser configured to dispense paper currency and/or a coin generator configured to dispense coins or tokens in a coin payout tray.

The gaming device 100 may further include one or more speakers 150 controlled by one or more sound cards 28 (FIG. 2B). The gaming device 100 illustrated in FIG. 2A includes a pair of speakers 150. In other embodiments, additional speakers, such as surround sound speakers, may be provided within or on the housing 105. Moreover, the gaming device 100 may include built-in seating with integrated headrest speakers.

In various embodiments, the gaming device 100 may generate dynamic sounds coupled with attractive multimedia images displayed on one or more of the display devices 116, 118, 140 to provide an audio-visual representation or to otherwise display full-motion video with sound to attract players to the gaming device 100 and/or to engage the player during gameplay. In certain embodiments, the gaming device 100 may display a sequence of audio and/or visual attraction messages during idle periods to attract potential players to the gaming device 100. The videos may be customized to provide any appropriate information.

The gaming device 100 may further include a card reader 138 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processing circuit determines the amount of funds entered and displays the corresponding amount on the credit or other suitable display as described above.

In some embodiments, the gaming device 100 may include an electronic payout device or module configured to fund an electronically recordable identification card or smart card or a bank or other account via an electronic funds transfer to or from the gaming device 100.

FIG. 2B is a block diagram that illustrates logical and functional relationships between various components of a gaming device 100. It should also be understood that components described in FIG. 2B may also be used in other computing devices, as desired, such as mobile computing devices for example. As shown in FIG. 2B, the gaming device 100 may include a processing circuit 12 that controls operations of the gaming device 100. Although illustrated as a single processing circuit, multiple special purpose and/or general purpose processors and/or processor cores may be provided in the gaming device 100. For example, the gaming device 100 may include one or more of a video processor, a signal processor, a sound processor and/or a communication controller that performs one or more control functions within the gaming device 100. The processing circuit 12 may be variously referred to as a "controller," "microcontroller," "microprocessor" or simply a "computer." The processor may further include one or more application-specific integrated circuits (ASICs).

Various components of the gaming device 100 are illustrated in FIG. 2B as being connected to the processing circuit 12. It will be appreciated that the components may be connected to the processing circuit 12 through a system bus 151, a communication bus and controller, such as a universal serial bus (USB) controller and USB bus, a network interface, or any other suitable type of connection.

The gaming device 100 further includes a memory device 14 that stores one or more functional modules 20. Various functional modules 20 of the gaming device 100 will be described in more detail below in connection with FIG. 2D.

The memory device 14 may store program code and instructions, executable by the processing circuit 12, to control the gaming device 100. The memory device 14 may also store other data such as image data, event data, player input data, random or pseudo-random number generators, pay-table data or information and applicable game rules that relate to the play of the gaming device. The memory device 14 may include random access memory (RAM), which can include non-volatile RAM (NVRAM), magnetic RAM (ARAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The gaming device 100 may further include a data storage 22, such as a hard disk drive or flash memory. The data storage 22 may store program data, player data, audit trail data or any other type of data. The data storage 22 may include a detachable or removable memory device, including, but not limited to, a suitable cartridge, disk, CD ROM, Digital Video Disc ("DVD") or USB memory device.

The gaming device 100 may include a communication adapter 26 that enables the gaming device 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or NFC that enable the gaming device 100 to communicate, for example, with a mobile communication device operated by a player.

The gaming device 100 may include one or more internal or external communication ports that enable the processing circuit 12 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, Small Computer System Interface ("SCSI") ports, solenoids, speakers, thumb drives, ticket readers, touch screens, trackballs, touchpads, wheels, and wireless communication devices. In some embodiments, internal or external peripheral devices may communicate with the processing circuit through a USB hub (not shown) connected to the processing circuit 12.

In some embodiments, the gaming device 100 may include a sensor, such as a camera 127, in communication with the processing circuit 12 (and possibly controlled by the processing circuit 12) that is selectively positioned to acquire an image of a player actively using the gaming device 100 and/or the surrounding area of the gaming device 100. In one embodiment, the camera 127 may be configured to selectively acquire still or moving (e.g., video) images and may be configured to acquire the images in either an analog, digital or other suitable format. The display devices 116, 118, 140 may be configured to display the image acquired by the camera 127 as well as display the visible manifestation of the game in split screen or picture-in-picture fashion. For example, the camera 127 may acquire an image of the player and the processing circuit 12 may incorporate that image into the primary and/or secondary game as a game image, symbol or indicia.

Various functional modules of that may be stored in a memory device 14 of a gaming device 100 are illustrated in FIG. 2C. Referring to FIG. 2C, the gaming device 100 may include in the memory device 14 a game module 20A that includes program instructions and/or data for operating a hybrid wagering game as described herein. The gaming device 100 may further include a player tracking module 20B, an electronic funds transfer module 20C, an input device interface 20D, an audit/reporting module 20E, a communication module 20F, an operating system kernel 20G and a random number generator 20H. The player tracking module 20B keeps track of the play of a player. The electronic funds transfer module 20C communicates with a back end server or financial institution to transfer funds to and from an account associated with the player. The input device interface 20D interacts with input devices, such as the input device 130, as described in more detail below. The communication module 20F enables the gaming device 100 to communicate with remote servers and other gaming devices using various secure communication interfaces. The operating system kernel 20G controls the overall operation of the gaming device 100, including the loading and operation of other modules. The random number generator 20H generates random or pseudorandom numbers for use in the operation of the hybrid games described herein.

In some embodiments, a gaming device 100 includes a personal device, such as a desktop computer, a laptop computer, a mobile device, a tablet computer or computing device, a personal digital assistant (PDA), or other portable computing devices. In some embodiments, the gaming device 100 may be operable over a wireless network, such as part of a wireless gaming system. In such embodiments, the gaming machine may be a hand-held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 2D:
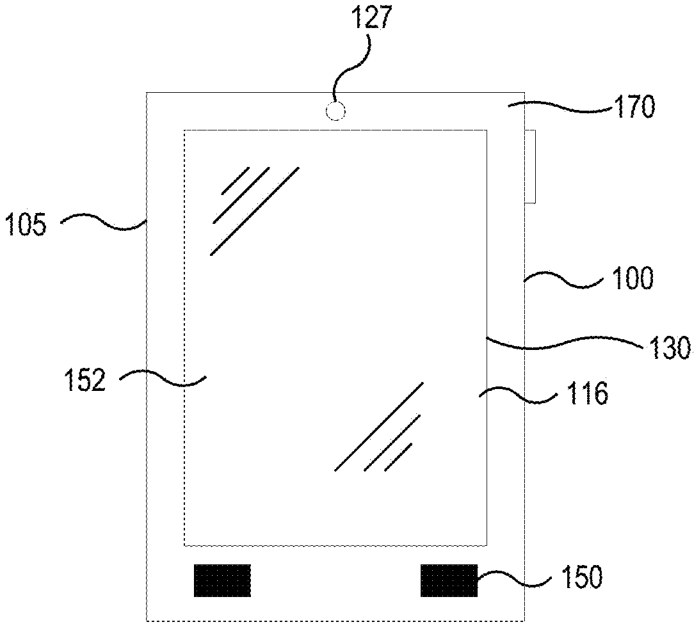
FIG. 2D is perspective view of a gaming device that can be configured according to some embodiments.

For example, referring to FIG. 2D, a gaming device 100 (which is a mobile gaming device 170 in this embodiment) may be implemented as a handheld device including a compact housing 105 on which is mounted a touchscreen display device 116 including a digitizer 152. One or more input devices 130 may be included for providing functionality of for embodiments described herein. A camera 127 may be provided in a front face of the housing 105. The housing 105 may include one or more speakers 150. In the gaming device 100, various input buttons described above, such as the cashout button, gameplay activation button, etc., may be implemented as soft buttons on the touchscreen display device 116 and/or input device 130. In this embodiment, the input device 130 is integrated into the touchscreen display device 116, but it should be understood that the input device may also, or alternatively, be separate from the display device 116. Moreover, the gaming device 100 may omit certain features, such as a bill acceptor, a ticket generator, a coin acceptor or dispenser, a card reader, secondary displays, a bet display, a credit display, etc. Credits can be deposited in or transferred from the gaming device 100 electronically.

Figure 2E:
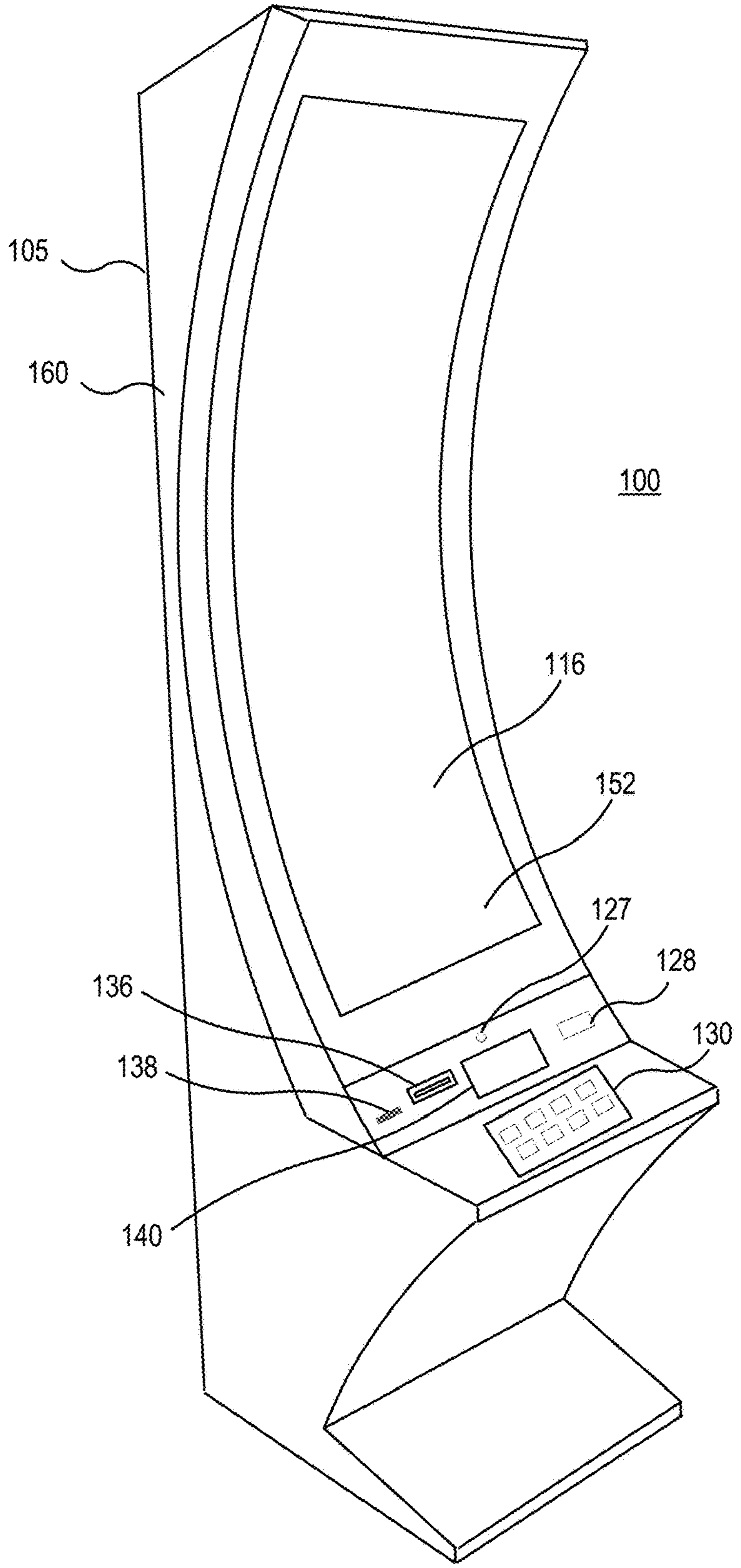
FIG. 2E is a perspective view of a gaming device according to further embodiments.

FIG. 2E illustrates a standalone gaming device 100 (which is an EGM 160 in this embodiment) having a different form factor from the EGM 160 illustrated in FIG. 2A. In particular, the gaming device 100 is characterized by having a large, high aspect ratio, curved primary display device 116 provided in the housing 105, with no secondary display device. The primary display device 116 may include a digitizer 152 to allow touchscreen interaction with the primary display device 116. The gaming device 100 may further include a player tracking display 142, an input device 130, a bill/ticket acceptor 128, a card reader 138, and a bill/ticket dispenser 136. The gaming device 100 may further include one or more cameras 127 to enable facial recognition and/or motion tracking.

Figure 2F:
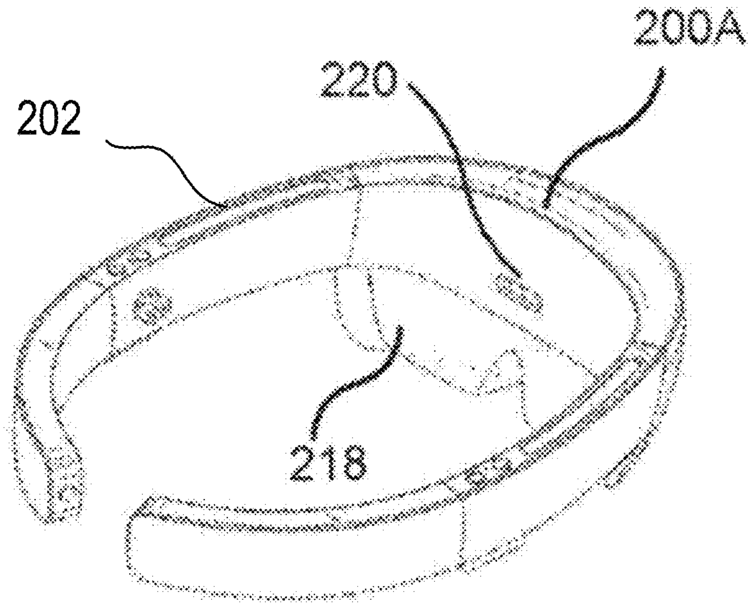
FIGS. 2F and 2G illustrate VR/AR devices according to various embodiments.

FIG. 2F illustrates a virtual reality (VR) viewer 200A implemented as a 3D headset including a pair of displays 218 on which images of virtual objects may be displayed. The viewer 200A includes a head-wearable frame 202, with the displays 218 coupled to the frame 202 to position the display device in a field of view of user wearing the viewer 200A. Different stereoscopic images may be displayed on the displays 218 to create an appearance of depth. The VR viewer 200A may include a plurality of sensors 220 that the device uses to determine a position, orientation, and/or movement of the viewer 200A, which may be used to determine a position, orientation, and/or direction of movement within an SVE.

The viewer 200A may further include other sensors, such as a gyroscopic sensor, a GPS sensor, one or more accelerometers, and/or other sensors that allow the viewer 200A to determine its position and orientation in space. In some embodiments, the viewer 200A may include one or more cameras that allow the viewer 200A to determine its position and/or orientation in space using visual simultaneous localization and mapping (VSLAM). Viewer 200A may further include one or more microphones and/or speakers that allow the user to interact audially with the device.

In some embodiments, a viewer may also include semi-transparent lenses that allow the user to see both the real world as well as the 3D image rendered on the lenses, e.g., to provide an augmented reality (AR) experience. The viewer may also include additional cameras or other sensors to obtain a live video signal for building a 3D model of the space around the user. The viewer may also generate a 3D image of an object to display to the user that takes into account the real world objects around the user and allows the user to interact with the 3D object.

Figure 2G:
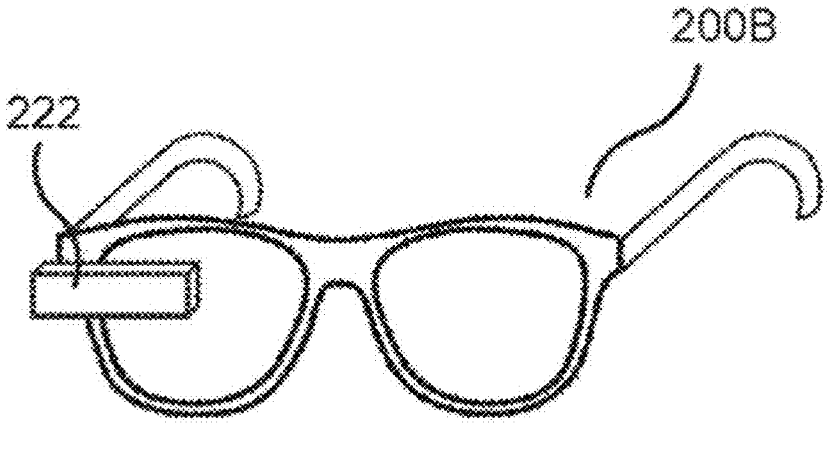

Referring to FIG. 2G, an augmented reality (AR) viewer 200B may be implemented as a pair of glasses including a transparent prismatic display 222 that displays an image to a single eye of the user. Such a device may be capable of displaying images to the user while allowing the user to see the world around the user, and as such can be used as an AR device.

In other embodiments, a VR and/or AR viewer may be implemented using a virtual retinal display device that raster scans an image directly onto the retina of the user. In still further embodiments, a VR and/or AR viewer may be implemented using a mobile wireless device, such as the mobile gaming device 170 of FIG. 2D above, a mobile telephone, a tablet computing device, and/or a personal digital assistant, etc.

Although illustrated as certain gaming devices, such as electronic gaming machines (EGMs), mobile gaming devices, VR/AR headsets, etc., functions and/or operations as described herein may also include wagering stations that may include electronic game tables, conventional game tables including those involving cards, dice and/or roulette, and/or other wagering stations such as sports book stations, video poker games, skill-based games, virtual casino-style table games, or other casino or non-casino style games. Further, gaming devices according to embodiments herein may be implemented using other computing devices and mobile devices, such as smart phones, tablets, and/or personal computers, among others.

Figure 3A:
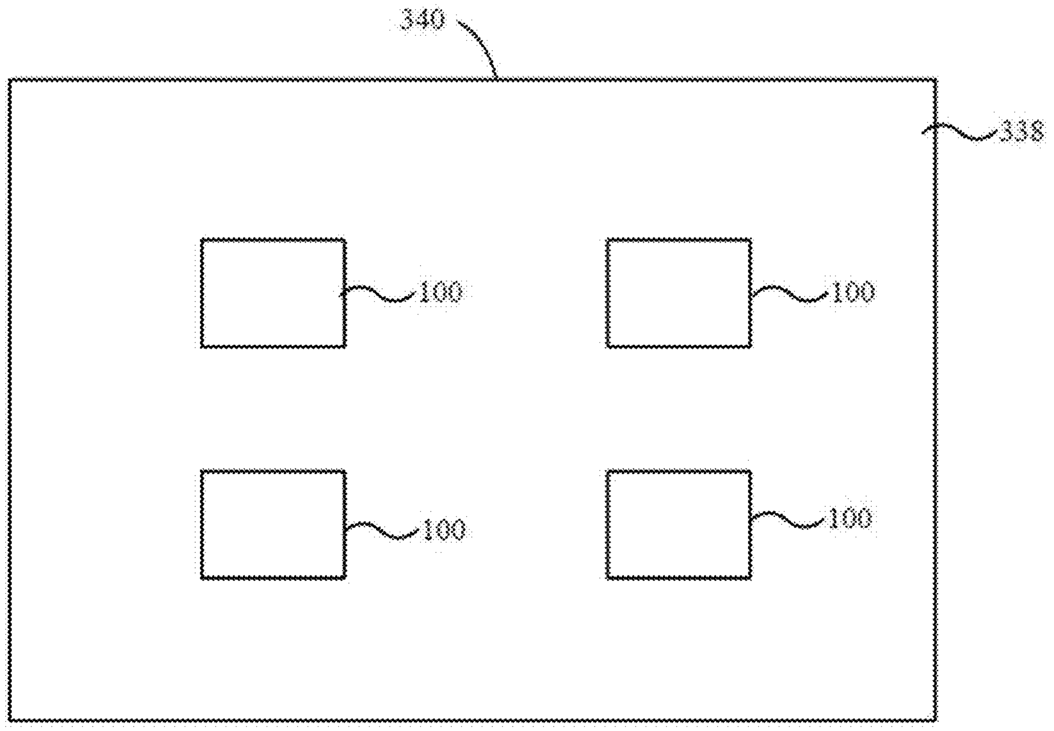
FIG. 3A is a map of a gaming area, such as a casino floor, according to some embodiments.

FIG. 3A illustrates, in plan view, an example map 338 of a gaming area 340. The gaming area 340 may, for example, be a casino floor. The map 338 shows the location of a plurality of EGMs 100 within the gaming area 340. As will be appreciated, the locations of the EGMs 100 within a gaming area 340 are generally fixed, although EGMs may be relocated from time to time, such as when new EGMs are introduced, to create new traffic flow patterns within the gaming area 340, to feature or highlight certain games, etc. As noted above, in order to assist the operation of the VR devices 200, the VR/AR controller 114 may store a three dimensional wireframe map of the gaming area 340, and may provide the three dimensional wireframe map to the VR viewers 200.

Figure 3B:
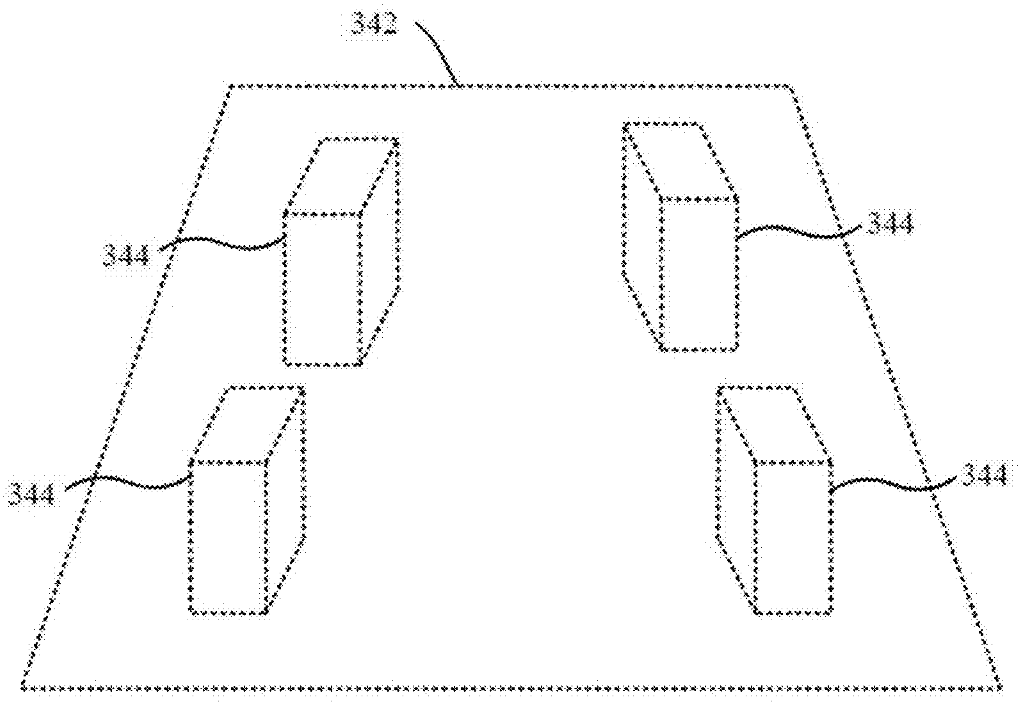
FIG. 3B is a 3D wireframe model of the gaming area of FIG. 3A, according to some embodiments.

An example of a wireframe map 342 for an SVE is shown in FIG. 3B. The wireframe map 342 is a three-dimensional model of the gaming area 340. As shown in FIG. 3B, the wireframe map 342 includes wireframe models 344 that may correspond to the EGMs 100 that are physically in the gaming area 340. The wireframe models 344 may also be entirely or partially virtual, e.g., existing only in the wireframe model 344 for the SVE. The wireframe models 344 may be pregenerated to correspond to various EGM form factors, such as single display EGMs, mechanical slot EGMs, dual display EGMs, etc. The pregenerated models may then be placed into the wireframe map 342, for example, by a designer or other personnel. The wireframe map 342 may be updated at any time. For example, in an example where the wireframe map 342 corresponds to a real-world gaming area 340, the wireframe map 342 may be updated whenever the physical location of EGMs in the gaming area 340 is changed.

In some embodiments, the wireframe map 342 may be generated automatically using a VR/AR device 200, such as a 3D headset, that is configured to perform a three-dimensional depth scan of its surroundings and generate a three dimensional model based on the scan results. Thus, for example, an operator using a VR/AR device 200 may perform a walkthrough of the gaming area 340 while the VR/AR device 200 builds the 3D map of the gaming area.

The three dimensional wireframe map 342 may enable a VR/AR device 200 to more quickly and accurately determine its position and/or orientation within the gaming area. For example, a VR/AR device 200 may determine its location within the gaming area 340 using one or more position/orientation sensors. The VR/AR device 200 then builds a three dimensional map of its surroundings using depth scanning, and compares its sensed location relative to objects within the generated three dimensional map with an expected location based on the location of corresponding objects within the wireframe map 342. The VR/AR device 200 may calibrate or refine its position/orientation determination by comparing the sensed position of objects with the expected position of objects based on the wireframe map 342. Moreover, in an AR implementation, the VR/AR device 200 can be aware of objects or destinations within the gaming area 340 that it has not itself scanned, because the VR/AR device 200 has access to the wireframe map 342 of the entire gaming area 340. Processing requirements on the VR/AR device 200 may also be reduced because the wireframe map 342 is already available to the VR/AR device 200.

In some embodiments, the wireframe map 342 may store various information about EGMs in the gaming area, such as the identity, type, orientation and location of various types of EGMs, the locations of exits, bathrooms, courtesy desks, cashiers, ATMs, ticket redemption machines, etc. Such information may be used by a VR/AR device 200 to help the user navigate the gaming area. For example, if a user desires to find a destination within the gaming area, the user may ask the VR/AR device 200 for directions using a built-in microphone and voice recognition function in the VR/AR device 200 or use other hand gestures or eye/gaze controls tracked by the VR/AR device 200 (instead of or in addition to voice control). The VR/AR device 200 may process the request to identify the destination, and then may display a virtual object, such as a virtual path on the ground, virtual arrow, virtual sign, etc., to help the user to find the destination. In some embodiments, for example, the VR/AR device 200 may display a halo or glow around the destination to highlight it for the user, or have virtual 3D sounds coming from it so players could more easily find the machine.

According to some embodiments, a user of a VR/AR device 200 may use the VR/AR device 200 to obtain information about players and/or EGMs on a casino gaming floor. The information may be displayed to the user on the VR/AR device 200 in a number of different ways such as by displaying images on the VR/AR device 200 that appear to be three dimensional or two dimensional elements of the scene as viewed through the VR/AR device 200. In general, the type and/or amount of data that is displayed to the user may depend on what type of user is using the VR/AR device 200 and, correspondingly, what level of permissions or access the user has. For example, a VR/AR device 200 may be operated in one of a number of modes, such as a player mode, an observer mode or an operator mode. In a player mode, the VR/AR device 200 may be used to display information about particular EGMs on a casino floor. The information may be generic information about an EGM or may be customized information about the EGM based on the identity or preferences of the user of the VR/AR device 200. In an observer mode, the VR/AR device 200 may be used to display information about particular EGMs on a casino floor or information about players of EGMs on the casino floor. In an operator mode, the VR/AR device 200 may also be used to display information about particular EGMs on a casino floor or information about players of EGMs on the casino floor, but the information may be different or more extensive than the information displayed to an observer.

Figure 4A:
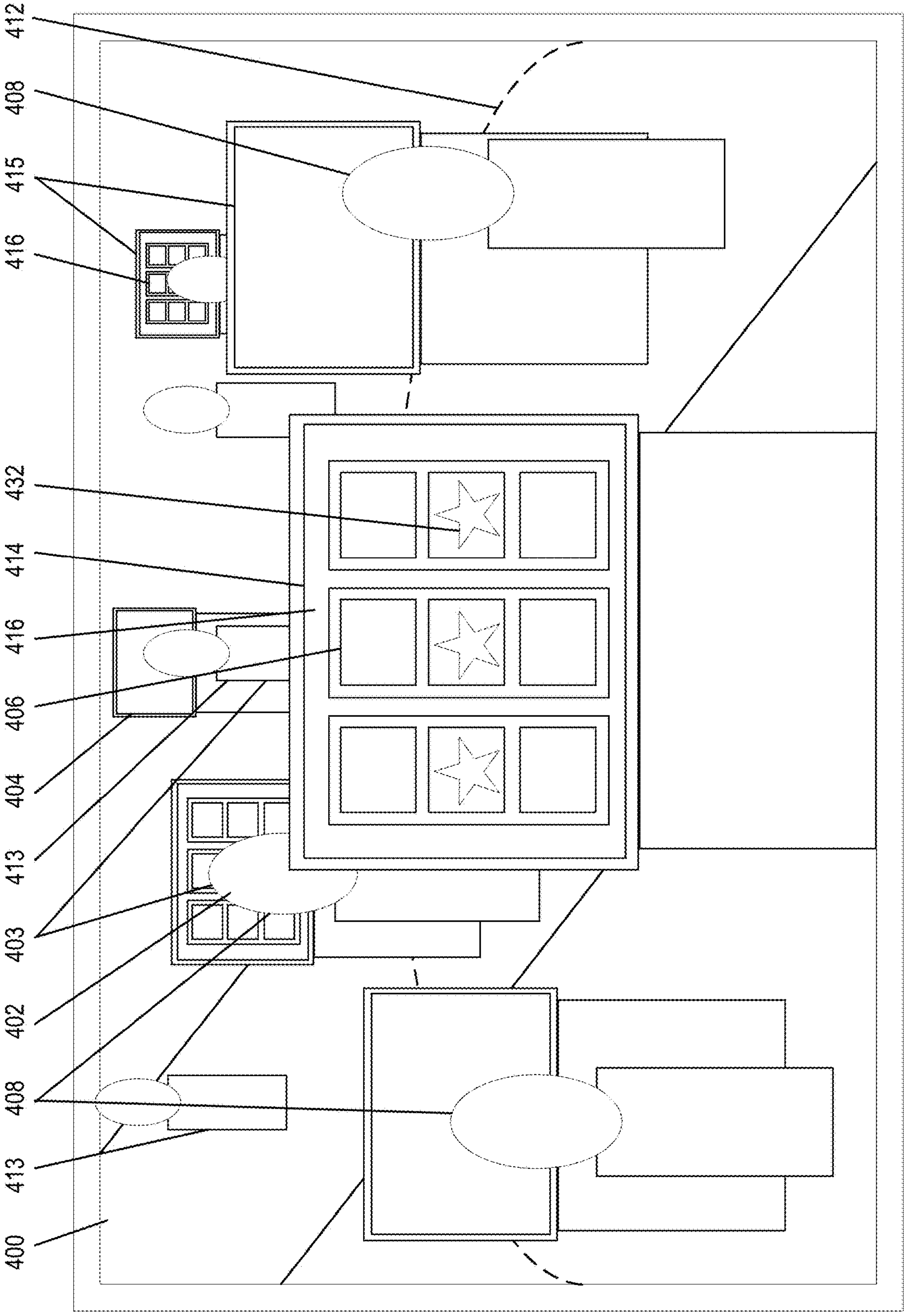
FIGS. 4A and 4B illustrate a shared virtual environment for providing shared celebration experiences among players, according to some embodiments.
Figure 4B:
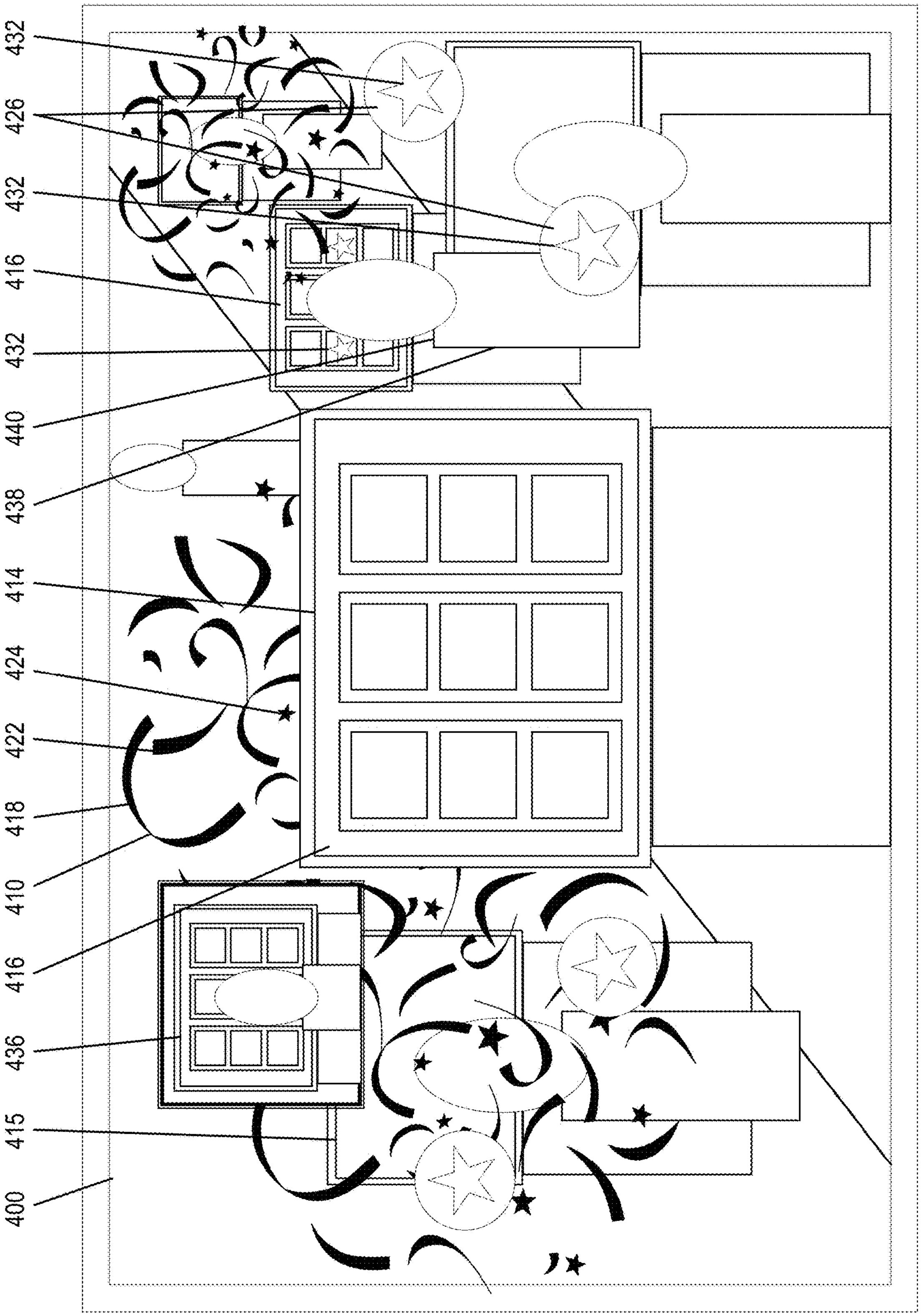

FIGS. 4A and 4B illustrates a shared virtual environment (SVE) 400 for a virtual casino environment, according to some embodiments. In this embodiment, the SVE 400 includes a plurality of virtual persons 402 and a plurality of virtual gaming devices 404. The plurality of virtual persons 402 may include a plurality of players 403 each wearing a respective player device for receiving display data corresponding to the SVE 400, including user display data that causes a display device of the respective player device to render a portion of the SVE 400 based on a virtual orientation of the player device and a virtual location of the player 403 in the SVE 400.

FIG. 4A illustrates the SVE 400 as viewed by a first player of the plurality of player 403. Based on a celebration trigger condition, such as a winning game result 406 for a first player, a subset 408 of players 403 is selected based on the celebration trigger condition and a celebration viewing parameter value associated with each player of the subset 408 of players 403. In this example, selection of the subset of players is further based on a proximity 412 of the virtual location 413 of each player 403 in the SVE 400 to the virtual location of the first player in the SVE 400. In some examples, the selection of the subset 408 of players 403 may be based on other criteria as well, such as a relevance parameter for each player 403 with respect to the first player. Alternatively, or in addition, the selection of the subset 408 of players 403 may be based on whether the player 403 is playing the same wagering game 416 as the first player and/or whether the player 403 is playing a different wagering game, which may share a game characteristic, e.g., theme, denomination, etc., with the wagering game 416 being played by the first player.

FIG. 4B illustrates the SVE 400 as viewed by another player that is part of the selected subset 408 of players 403. As shown by FIG. 4B, celebration display data corresponding to the celebration trigger condition is transmitted to a subset of player devices associated with each of the subset of players 403, wherein the celebration display data causes each display device of the subset of player devices to render celebration content 410 associated with the celebration trigger condition.

In this example, the virtual location 413 of each player 403 of the subset 408 includes an active play area 414 in the SVE 400 associated with the wagering game 416 being played by the player. In this example, the celebration content 410 for each player 403 of the subset 408 of players is rendered in SVE 400 outside the active play area 414 for the player. For example, as shown in FIG. 4A, the celebration content 410 is rendered to as to not obstruct the active player area 414 for the first player, but the celebration content 410 may still obstruct other active play areas 415 for other players 403 in the SVE 400 from the viewpoint of the first player. Likewise, as shown in FIG. 4B, the celebration content 410 is rendered to as to not obstruct the active player area 414 for the respective player, and the celebration content 410 may still similarly obstruct other active play areas 415 for other players 403 in the SVE 400 from the viewpoint of the respective player.

In this embodiment, the celebration content 410 may include a plurality of graphical elements 418 rendered in a three-dimensional area in the SVE 400 around the virtual location of the player. For example, the graphical elements 418 may include three dimensional graphical elements 418 such as fireworks 422, confetti 424, falling coins 426, etc., as desired. In this example, the SVE 400 may also display, for each player 403 of the subset 408, an indication of a respective celebration bonus award 428 to be awarded to the player. In some examples, the graphical elements 418 may include graphical representations of game elements 418 associated with the wagering game 416, such as game elements 432 associated with the winning result 406 in the wagering game 416 being displayed on the graphical falling coins 426 for example.

In some examples, the celebration content 410 for the other players 403 in the subset 408 may include a live video image 436 of the first player 438, and may further include the three dimensional graphical elements 418 rendered in the SVE 400 around the live video image 436.

In some examples, the celebration content 410 may include a virtual avatar 440 corresponding to the first player 438, which may be generated based on a live video image (such as the live video image 436 of FIG. 4B for example) of the first player for example. In this example, the virtual avatar 440 may be animated to appear to react to the celebration trigger condition, e.g., with facial expressions, actions, etc. In some examples, the first player 438 and/or the virtual avatar 440 may virtually move through a plurality of virtual locations in the SVE 400 each within a proximity of a virtual location 413 of a respective player 403 of the selected subset 408.

Figure 5:
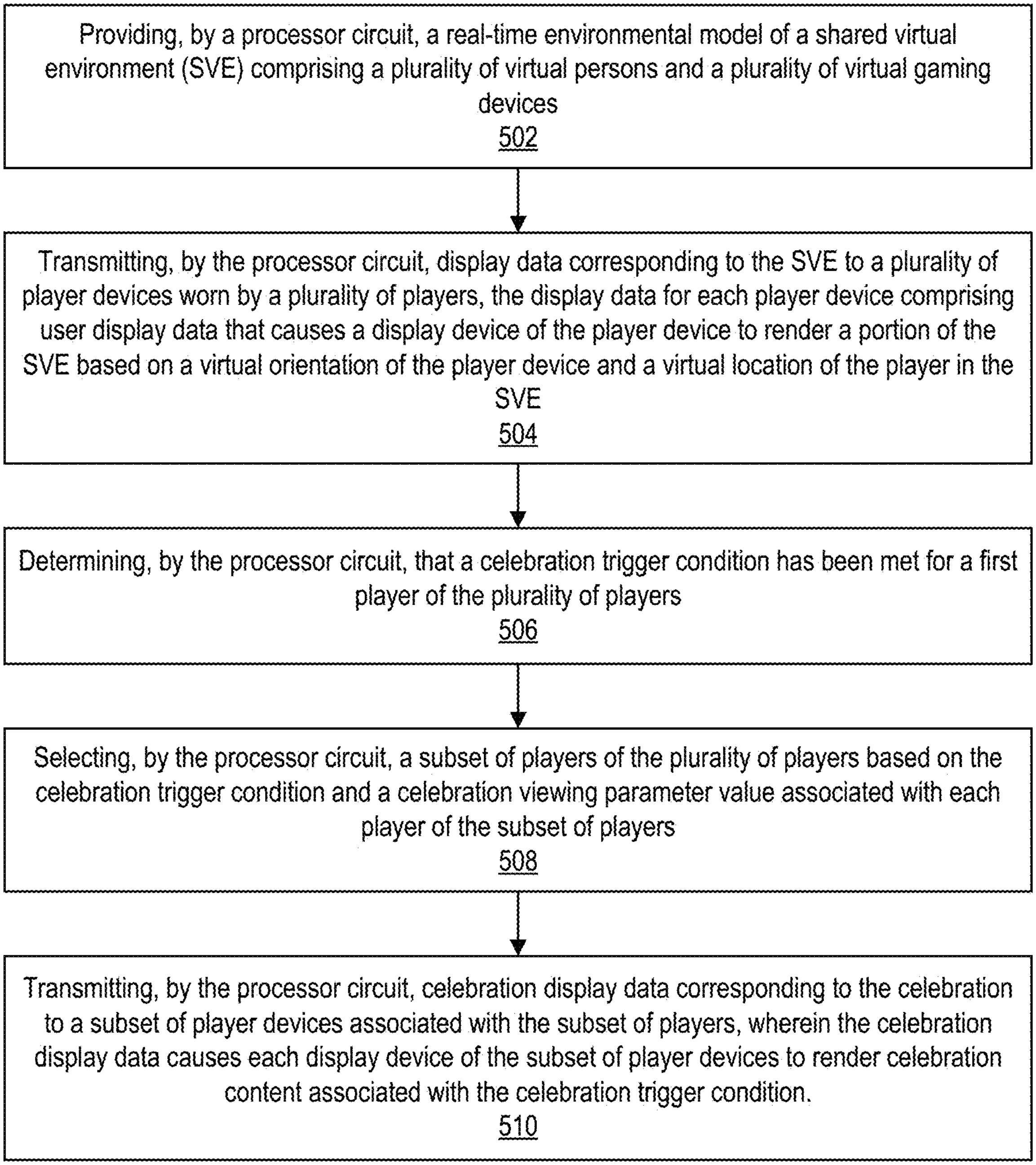
FIG. 5 is a flowchart illustrating operations of systems/methods of facilitating shared celebration experiences among players in a shared virtual gaming environment, according to some embodiments.

FIG. 5 is a flowchart illustrating operations 500 of systems/methods for facilitating embodiments described herein. The operations 500 may be performed by one or more processor circuits of one or more computing devices, such as any of the computing devices described herein, for example. The operations 500 may include providing, by a processor circuit, a real-time environmental model of a shared virtual environment (SVE) comprising a plurality of virtual persons and a plurality of virtual gaming devices (Block 502). The operations 500 may further include transmitting, by the processor circuit, display data corresponding to the SVE to a plurality of player devices worn by a plurality of players, the display data for each player device comprising user display data that causes a display device of the player device to render a portion of the SVE based on a virtual orientation of the player device and a virtual location of the player in the SVE (Block 504). The operations 500 may further include determining, by the processor circuit, that a celebration trigger condition has been met for a first player of the plurality of players (Block 506). The operations 500 may further include selecting, by the processor circuit, a subset of players of the plurality of players based on the celebration trigger condition and a celebration viewing parameter value associated with each player of the subset of players (Block 508). The operations 500 may further include transmitting, by the processor circuit, celebration display data corresponding to the celebration to a subset of player devices associated with the subset of players, wherein the celebration display data causes each display device of the subset of player devices to render celebration content associated with the celebration trigger condition (Block 510).

Embodiments described herein may be implemented in various configurations for gaming devices 100, including but not limited to: (1) a dedicated gaming device, wherein the computerized instructions for controlling any games (which are provided by the gaming device) are provided with the gaming device prior to delivery to a gaming establishment; and (2) a changeable gaming device, where the computerized instructions for controlling any games (which are provided by the gaming device) are downloadable to the gaming device through a data network when the gaming device is in a gaming establishment. In some embodiments, the computerized instructions for controlling any games are executed by at least one central server, central controller or remote host. In such a "thin client" embodiment, the central server remotely controls any games (or other suitable interfaces), and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In some embodiments, a gaming device may be operated by a mobile device, such as a mobile telephone, tablet or other mobile computing device. For example, a mobile device may be communicatively coupled to a gaming device and may include a user interface that receives user inputs that are received to control the gaming device. The user inputs may be received by the gaming device via the mobile device.

In some embodiments, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more gaming devices; and/or (c) one or more personal gaming devices, such as desktop computers, laptop computers, tablet computers or computing devices, PDAs, mobile telephones such as smart phones, and other mobile computing devices.

In certain such embodiments, computerized instructions for controlling any games (such as any primary or base games and/or any secondary or bonus games) displayed by the gaming device are executed by the central server, central controller, or remote host. In such "thin client" embodiments, the central server, central controller, or remote host remotely controls any games (or other suitable interfaces) displayed by the gaming device, and the gaming device is utilized to display such games (or suitable interfaces) and to receive one or more inputs or commands. In other such embodiments, computerized instructions for controlling any games displayed by the gaming device are communicated from the central server, central controller, or remote host to the gaming device and are stored in at least one memory device of the gaming device. In such "thick client" embodiments, the at least one processor of the gaming device executes the computerized instructions to control any games (or other suitable interfaces) displayed by the gaming device.

In some embodiments in which the gaming system includes: (a) a gaming device configured to communicate with a central server, central controller, or remote host through a data network; and/or (b) a plurality of gaming devices configured to communicate with one another through a data network, the data network is an internet or an intranet. In certain such embodiments, an internet browser of the gaming device is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the gaming device, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the gaming device.

It should be appreciated that the central server, central controller, or remote host and the gaming device are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of gaming devices to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

In the above description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product including one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, radio frequency ("RF"), etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, Common Business Oriented Language ("COBOL") 2002, PHP: Hypertext Processor ("PHP"), Advanced Business Application Programming ("ABAP"), dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (Saas).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processing circuit of a general purpose computer, special purpose computer, or other programmable data processing apparatus to produce a machine, such that the instructions, which execute via the processing circuit of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operations to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well (e.g., "one or more"), unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A system comprising:

a processor circuit; and a memory coupled to the processor circuit, the memory comprising machine readable instructions that, when executed by the processor circuit, cause the processor circuit to:

provide a real-time environmental model of a shared virtual environment (SVE) comprising a plurality of virtual persons and a plurality of virtual gaming devices;

transmit display data corresponding to the SVE to a plurality of player devices worn by a plurality of players, the display data for each player device comprising user display data that causes a display device of the player device to render a portion of the SVE based on a virtual orientation of the player device and a virtual location of the player in the SVE;

determine that a celebration trigger condition has been met for a first player of the plurality of players;

select a subset of players of the plurality of players based on the celebration trigger condition and a celebration viewing parameter value associated with each player of the subset of players;

determine interested players of the subset of players based on gaming activity of the interested players indicating gaming preferences of the interested players, wherein the gaming preferences of the interested players match with game characteristics of a game associated with the celebration trigger condition; and transmit celebration display data corresponding to the celebration trigger condition to a subset of player devices associated with the interested players, wherein the celebration display data causes each display device of the subset of player devices to render celebration content associated with the celebration trigger condition.

2. The system of claim 1, wherein the selection of the subset of players is further based on a proximity of the virtual location of each player in the SVE to the virtual location of the first player in the SVE.

3. The system of claim 1, wherein a virtual location of each player of the subset of players comprises an active play area in the SVE associated with a wagering game being played by the player, and wherein the celebration content for each player of the subset of players is rendered in SVE outside the active play area for the player.

4. The system of claim 1, wherein the celebration content for each player of the interested players comprises a plurality of graphical elements rendered in a three-dimensional area in the SVE around the virtual location of the player.

5. The system of claim 4, wherein the plurality of graphical elements comprises a plurality of three-dimensional graphical elements.

6. The system of claim 4, wherein the plurality of graphical elements comprises graphical representations of one of fireworks, confetti, and falling coins.

7. The system of claim 4, wherein the celebration trigger condition comprises a winning result in a wagering game being played by the first player, and wherein the plurality of graphical elements comprises graphical representations of game elements associated with the wagering game.

8. The system of claim 7, wherein the game elements associated with the wagering game comprise game elements associated with the winning result in the wagering game.

9. The system of claim 1, wherein the celebration content for each player of the interested players comprises a live video image of the first player.

10. The system of claim 9, wherein the celebration content for each player of the interested players further comprises a plurality of graphical elements rendered in a three dimensional area in the SVE around the live video image of the first player.

11. The system of claim 1, wherein the celebration content for each player of the interested players comprises a virtual avatar corresponding to the first player.

12. The system of claim 11, wherein the virtual avatar is generated based on a live video image of the first player.

13. The system of claim 11, wherein the virtual avatar is animated to appear to react to the celebration trigger condition.

14. The system of claim 1, wherein the celebration trigger condition comprises a winning result in a first wagering game being played by the first player and wherein the selection of the subset of players is further based on each player of the subset of players playing the first wagering game.

15. The system of claim 1, wherein the celebration trigger condition comprises a winning result in a first wagering game being played by the first player, the first wagering game comprising a first game characteristic and wherein the selection of the subset of players is further based on each player of the subset of players playing a second wagering game different from the first wagering game, the second wagering game comprising the first game characteristic.

16. The system of claim 1, wherein the selection of the subset of players is further based on a determination of gaming interests for each player of the subset of players with respect to the first player, wherein the gaming interests for each player of the subset of players is determined based on gaming activity of the subset of players.

17. The system of claim 1, wherein the instructions further cause the processor circuit to:

display, for each player of the interested players, an indication of a respective celebration bonus award for the player; and award, for each player of the interested players, the respective celebration bonus award to the player.

18. The system of claim 1, wherein the instructions further cause the processor circuit to virtually move the first player through a plurality of virtual locations in the SVE, each of the plurality of virtual locations in the SVE being within a proximity of a virtual location of a player of the interested the plurality of players.

19. A wearable gaming device comprising:

a display device;

a processor circuit; and a memory coupled to the processor circuit, the memory comprising machine readable instructions that, when executed by the processor circuit, cause the processor circuit to:

provide a real-time environmental model of a shared virtual environment (SVE) comprising a plurality of virtual persons and a plurality of virtual gaming devices;

transmit display data corresponding to the SVE to a plurality of player devices worn by a plurality of players, the plurality of player devices comprising the wearable gaming device, the display data for each player device comprising user display data that causes the display device to render a portion of the SVE based on a virtual orientation of the player device and a virtual location of the player in the SVE;

receive an indication that a first player wearing the wearable gaming device has been selected based on a celebration trigger condition associated with another player of the plurality of players and a celebration viewing parameter value associated with the first player;

determine gaming preferences of the first player, wherein the gaming preferences of the first player match with game characteristics of a game associated with the celebration trigger condition;

receive celebration display data corresponding to the celebration trigger condition; and based on the celebration display data, render, by the display device, celebration content associated with the celebration trigger condition.

20. A method comprising:

providing, by a processor circuit, a real-time environmental model of a shared virtual environment (SVE) comprising a plurality of virtual persons and a plurality of virtual gaming devices;

transmitting, by the processor circuit, display data corresponding to the SVE to a plurality of player devices worn by a plurality of players, the display data for each player device comprising user display data that causes a display device of the player device to render a portion of the SVE based on a virtual orientation of the player device and a virtual location of the player in the SVE;

determining, by the processor circuit, that a celebration trigger condition has been met for a first player of the plurality of players;

selecting, by the processor circuit, a subset of players of the plurality of players based on the celebration trigger condition and a celebration viewing parameter value associated with each player of the subset of players;

determine interested players of the subset of players based on gaming activity of the interested players indicating gaming preferences of the interested players, wherein the gaming preferences of the interested players match with game characteristics of a game associated with the celebration trigger condition; and transmitting, by the processor circuit, celebration display data corresponding to the celebration to a subset of player devices associated with the interested players, wherein the celebration display data causes each display device of the subset of player devices to render celebration content associated with the celebration trigger condition.

* * * * *